April 30, 1940.  J. DAMON  2,199,303
BROILER
Filed Oct. 28, 1939  2 Sheets-Sheet 1

Inventor

James Damon

By Clarence A. O'Brien
and Hyman Berman
Attorneys

April 30, 1940.  J. DAMON  2,199,303
BROILER
Filed Oct. 28, 1939      2 Sheets-Sheet 2
Fig. 3.
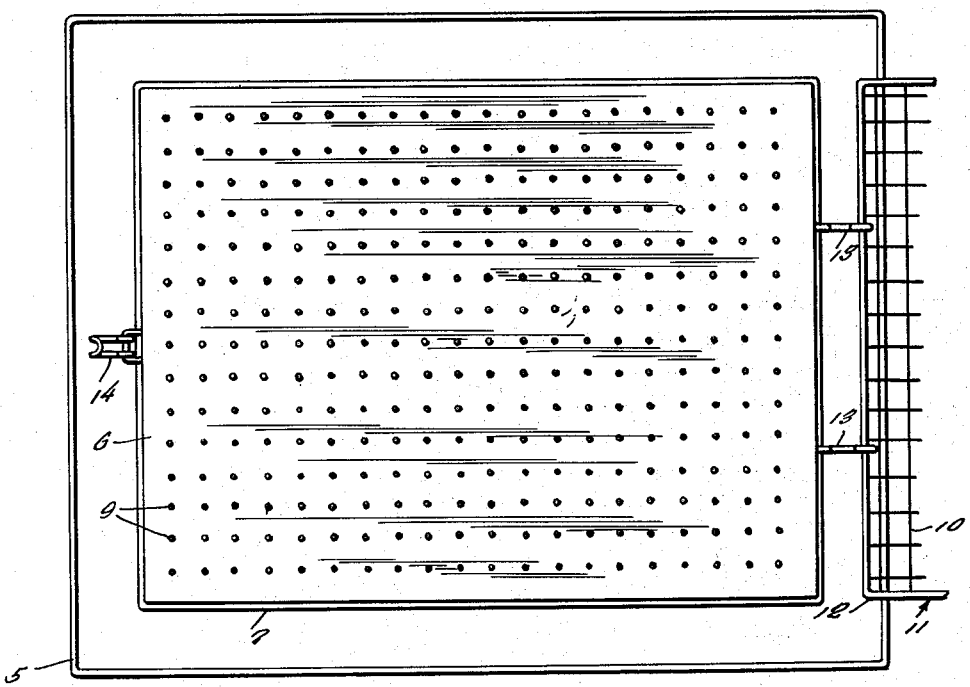
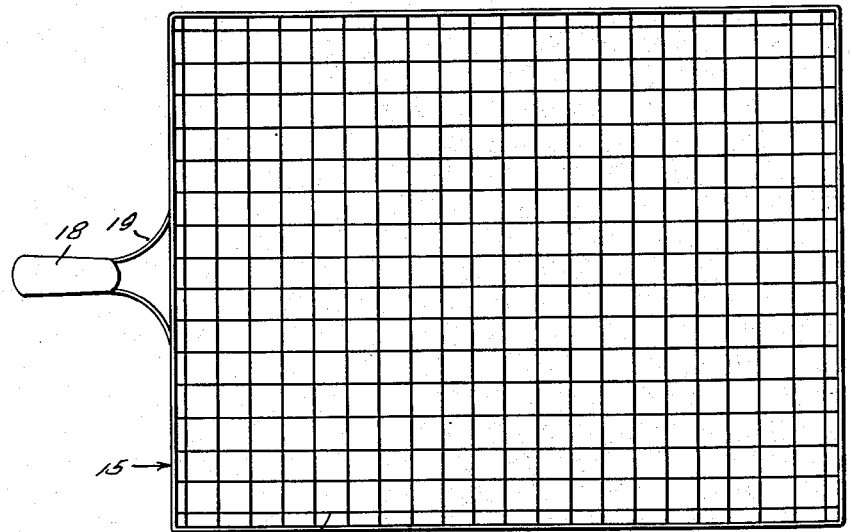
Fig. 4.
Inventor
James Damon
By Clarence A. O'Brien
and Hyman Berman
Attorneys Patented Apr. 30, 1940

2,199,303

UNITED STATES PATENT OFFICE 2,199,303

BROILER

James Damon, Middletown, N. Y.

Application October 28, 1939, Serial No. 301,843

3 Claims. (Cl. 53—5)

This invention appertains to new and useful improvements in cooking utensils and more particularly to a broiler especially adapted for broiling bacon as well as other kinds of thinly sliced meat.

The principal object of the present invention is to provide a broiler in which thinly sliced meat can be broiled in a quick and highly efficient manner.

Another important object of the invention is to provide a broiler in which bacon and thinly sliced meat can be broiled without likelihood of the meat shrinking.

Still another important object of the invention is to provide a utensil which can be easily handled with a minimum amount of inconvenience and effort on the part of the attendant.

These and other objects and advantages of the invention will become apparent to the reader of the following specification.

In the drawings:

Figure 3 is a top plan view of the utensil with the tray removed and the cover swung back.

Figure 4 is a top plan view of the tray.

Figure 1:
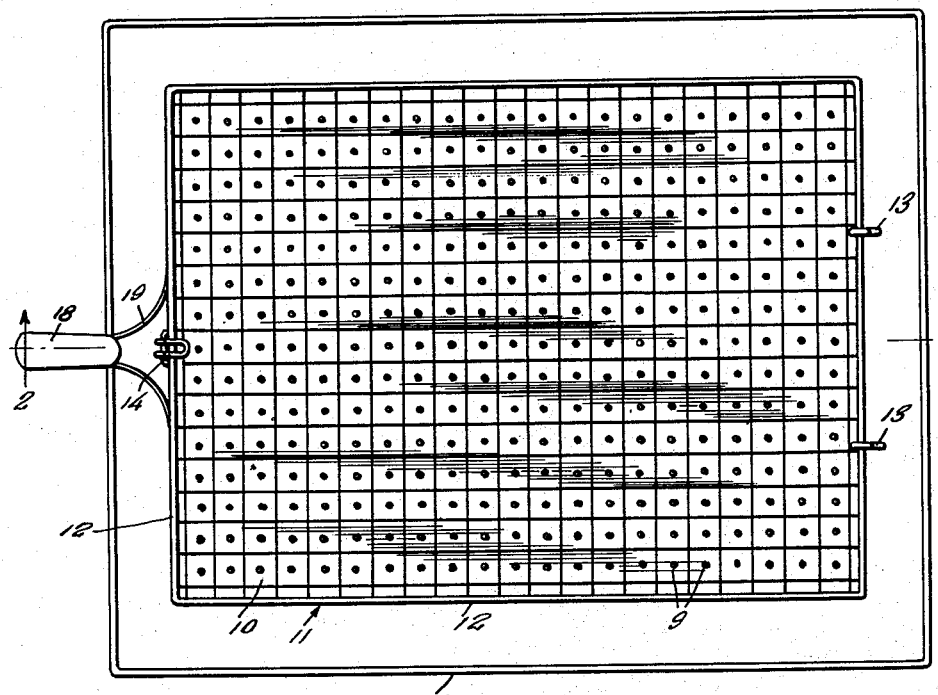
Figure 1 represents a top plan view of the utensil.

Referring to the drawings, wherein like numerals designate like parts, it can be seen that numeral 5 represents a pan in which the utensil generally referred to by numeral 5 can set, so as to catch the grease from the meat being cooked.

The utensil 5 consists in construction of a hot plate 6 having the downturned flange 7 which rests upon the bottom of the pan 5. Within the confines of the flange 7 and bearing against the bottom of the plate 6 is the thicker plate or board 8 which can be of asbestos or some other suitable and preferably fireproof material through which the nails 9 can be driven. These members 9 are referred to as being driven through the board 8 as it is believed that this would be the most economical way of manufacturing the utensil. Of course, in this connection the hot plate 6 would have to be preformed with openings matching the driven elements 9.

These driven elements 9 extend up a sufficient distance above the hot plate 6 so as to terminate within the foraminous filler 10 of the cover generally referred to by numeral 11, which includes the rectangular shaped frame 12 hingedly connected as at 13 to the flange 7 of the hot plate 6. A swingable hook member 14 is carried by the flange 7 and engageable over one end of the frame 12.

Numeral 15 generally refers to the tray and this includes the rectangular-shaped frame 16, matching in size the frame 12 and this frame 16 has the foraminous filler 17 and a handle 18 at one end thereof. This handle 18 is connected to the corresponding end of the frame 16 by diverged connecting members 19 which are diverged to allow clearance for the hook fastener 14.

Figure 2:
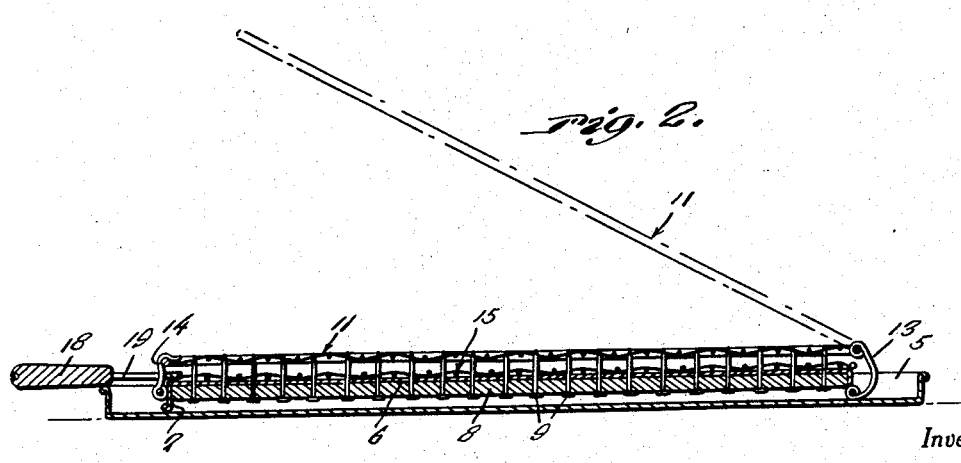
Figure 2 is a longitudinal sectional view taken substantially on a line 2—2 of Figure 1.

As is apparent in Figure 2, the tray 15 sets upon the hot plate 6 with the nails 9 extending upwardly through the foraminous filler 17. The bacon or other thinly sliced meat can now be placed over the nails or driven elements 9 and the cover 11 swung downwardly. This will push the meat down over the nails 9. The cover 11 is latched in place by the hook fastener 14 and with the parts thusly fastened together the bacon cannot coil or shrink during the broiling period.

When the cooked meat is to be removed, the cover 11 can be unfastened and swung to the position shown in Figure 3, after which the attendant can grasp the handle 18 and lift the tray 15, thus lifting the meat off of the nails of driven elements 9.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is—

1. A utensil of the character described comprising a hot plate, projecting members rising from the hot plate, a foraminous tray adapted to rest on the hot plate with the projections extending upwardly therethrough, and a cover swingably secured to the hot plate and adapted to be swung over the hot plate to clamp foodstuff to be cooked between itself and the said tray.

2. A utensil of the character described comprising a hot plate, projecting members rising from the hot plate, a foraminous tray adapted to rest on the hot plate with the projections extending upwardly therethrough, and a cover swingably secured to the hot plate and adapted to be swung over the hot plate to clamp foodstuff to be cooked between itself and the said tray, said hot plate being provided with a depending supporting flange at its perimeter, a filler block under the hot plate and within the confines of the flange, said projections being in the form of driven elements driven through the filler plate and openings in the hot plate.

3. A utensil of the character described comprising a hot plate, projecting members rising from the hot plate, a foraminous tray adapted to rest on the hot plate with the projections extending upwardly therethrough, and a cover swingably secured to the hot plate and adapted to be swung over the hot plate to clamp foodstuff to be cooked between itself and the said tray, said projections being provided with pointed upper ends over which foodstuff can be placed and pushed downwardly by the cover.

JAMES DAMON.